United States Patent
Izadi et al.

(10) Patent No.: US 12,116,033 B2
(45) Date of Patent: Oct. 15, 2024

(54) DYNAMIC CONTROL OF HUMAN-TETHERED E-PALLET

(71) Applicant: GM GLOBAL TECHNOLOGY OPERATIONS LLC, Detroit, MI (US)

(72) Inventors: Hojjat Izadi, North York (CA); Carlos E. Arreaza, Oakville (CA); Mohammad-Amin Rajaie, Richmond Hill (CA)

(73) Assignee: GM Global Technology Operations LLC, Detroit, MI (US)

( * ) Notice: Subject to any disclaimer, the term of this patent is extended or adjusted under 35 U.S.C. 154(b) by 574 days.

(21) Appl. No.: 17/511,665

(22) Filed: Oct. 27, 2021

(65) Prior Publication Data

US 2023/0125809 A1 Apr. 27, 2023

(51) Int. Cl.
*B62B 5/00* (2006.01)
*B62B 3/00* (2006.01)
(Continued)

(52) U.S. Cl.
CPC ............ *B62B 5/0043* (2013.01); *B62B 3/001* (2013.01); *B62B 5/0069* (2013.01); *B65D 19/42* (2013.01);
(Continued)

(58) Field of Classification Search
CPC ..... B62B 5/0043; B62B 3/001; B62B 5/0069; B65D 19/42; B65D 2519/00781; G01B 7/026; G01B 21/22; G01P 3/00
See application file for complete search history.

(56) References Cited

U.S. PATENT DOCUMENTS 9,963,331 B1 * 5/2018 Holmberg ............ G05D 1/0212
10,377,388 B2 * 8/2019 Mangette .............. B60W 50/06
(Continued)

FOREIGN PATENT DOCUMENTS

CN 104960570 A * 10/2015
CN 209835276 U * 12/2019
(Continued)

OTHER PUBLICATIONS

English translation of DE-102015115825-A1 (Year: 2017).*
English translation of WO-0032459-A1 (Year: 2000).*
English translation of CN-104960570-A (Year: 2015).*
English translation of CN-209835276-U (Year: 2019).*
(Continued)

*Primary Examiner* — Anshul Sood
*Assistant Examiner* — Matthew Ho
(74) *Attorney, Agent, or Firm* — Quinn IP Law (57) ABSTRACT

An electronic pallet (e-pallet) includes a superstructure mounted to a wheeled base platform. A tether device defines an articulation angle with respect to a leading edge of the superstructure, and is grasped by an operator towing the e-pallet. A motor connected to driven road wheels transmits a drive torque to the road wheels responsive to motor control signals, including a desired yaw rate and ground speed. A speed sensor, angle sensor, and length sensor are respectively configured to determine an actual ground speed of the e-pallet, the articulation angle, and a length of the tether device. An electronic controller, in response to the input signals, generates the motor control signals using proportional-integral-derivative (PID) control logic. Coupled lateral and longitudinal dynamics control loops respectively determine the desired yaw rate and ground speed to accommodate for motion of the operator.

20 Claims, 7 Drawing Sheets

(51) Int. Cl.
B65D 19/42 (2006.01)
G01B 7/02 (2006.01)
G01B 21/22 (2006.01)
G01P 3/00 (2006.01)

(52) U.S. Cl.
CPC ............. *G01B 7/026* (2013.01); *G01B 21/22* (2013.01); *G01P 3/00* (2013.01); *B65D 2519/00781* (2013.01)

(56) References Cited

U.S. PATENT DOCUMENTS

2014/0291594 A1* 10/2014 Newell ................. B62B 5/0033
254/2 R
2017/0072557 A1* 3/2017 Troy ..................... G06T 19/003

FOREIGN PATENT DOCUMENTS

| CN | 210855144 U * | 6/2020 | |
|----|----|----|----|
| DE | 102015115825 A1 * | 1/2017 | .......... B60W 30/146 |
| DE | 102019217817 A1 * | 5/2021 | |
| EP | 2360543 A1 * | 8/2011 | ............. B62D 59/04 |
| JP | 2021133775 A * | 9/2021 | |
| WO | WO-0032459 A1 * | 6/2000 | ............. B60L 15/00 |
| WO | WO-2021069674 A1 * | 4/2021 | ............. B66F 9/063 |

OTHER PUBLICATIONS

English translation of CN-210855144-U (Year: 2020).*
English translation of WO-2021069674-A1 (Year: 2021).*
English translation of JP-2021133775-A (Year: 2021).*
English translation of EP-2360543-A1 (Year: 2011).*
English translation of DE-102019217817-A1 (Year: 2021).*

* cited by examiner

DYNAMIC CONTROL OF HUMAN-TETHERED E-PALLET

INTRODUCTION

Manufacturing plants and warehouse facilities require the coordinated movement of raw materials, subcomponents, and finished parts, often over considerable distances. Larger or relatively massive loads are typically transported with the assistance of fork lifts, tractors, conveyor belts, and other power equipment. In contrast, smaller loads may be moved using manually operated pallet trucks, wheeled dollies, and hand carts. Collectively, machine powered and manually operated lift assistance devices improve overall production efficiency, while at the same time greatly reducing load-related stresses and strains on human operators within the workplace.

SUMMARY

The present disclosure pertains to methods and systems for controlling a motor-driven electric pallet ("e-pallet"). Certain operations not requiring the assistance of heavy power equipment of the type described generally above nevertheless may not be suitable for relatively small manually-operated devices like hand carts and dollies. In such cases, a human operator may utilize an electric pallet ("e-pallet") having a container mounted on a wheeled platform, with the container and/or platform being connected to a flexible tether device. As the operator grasps an end of the tether device and walks through a facility, the operator's applied towing forces propel the e-pallet in the operator's direction of travel. As this occurs, an electric motor may provide a motor drive torque to one or more road wheels of the e-pallet to gently assist the operator-imparted towing forces. E-pallets thus facilitate locomotion of cargo and other loads in a wide range of facilities and industries.

In particular, the disclosed control solutions are intended to optimize locomotion of an e-pallet constructed in such a manner. The tether device contemplated herein is equipped with length and angle sensors, the respective outputs of which are communicated to an onboard electronic controller as electronic control signals. Calculations and control actions performed by the electronic controller, acting as a receiving node in this arrangement, in turn enable the e-pallet to smoothly follow a desired motion trajectory initiated by the operator, while at the same time permitting the e-pallet's motion to remain robust to the operator's natural hand or arm swinging motions.

The described electronic controller in some embodiments is configured to correct a yaw command based on a non-linear function of the e-pallet's longitudinal speed, as well as a current length of the tether device as measured and reported by the length sensor contained therein or connected thereto. Additionally, the electronic controller limits a longitudinal speed command of the e-pallet based on a speed or torque capability of the electric motor(s). As part of the envisioned control architecture, a lateral control proportional-integral (PI) control loop is combined with a longitudinal PI control loop to create a dynamic response configured to closely match movements of the human operator.

An aspect of the present disclosure includes an e-pallet having a base platform, with a superstructure being mounted thereon or formed integrally therewith. A tether device connected to the superstructure defines an articulation angle ($\theta$) with respect to a leading edge of the superstructure, and is configured to be grasped at one end by a human operator when towing the e-pallet. Two or more road wheels are connected to the base platform in this embodiment. Additionally, at least one electric motor is operatively connected to the road wheels and configured to transmit a drive torque thereto. Drive torque transmission occurs in response to motor control signals, with the motor control signals including a desired yaw rate and a desired ground speed of the e-pallet.

In this particular embodiment of the e-pallet, a sensor suite includes a speed sensor, an angle sensor, and a length sensor configured to determine an actual ground speed of the e-pallet, the above-noted articulation angle, and a length of the tether device, respectively. An electronic controller in communication with the sensor suite is configured to generate the motor control signals in response to input signals inclusive of the actual ground speed, the articulation angle, and the length. This occurs using resident proportional-integral derivative (PID) control logic. The control logic contemplated herein includes a lateral dynamics control block/loop coupled with a longitudinal dynamics control block, with the blocks respectively determining the desired yaw rate and ground speed of the e-pallet. In this manner the electronic controller is able to accommodate motion of the human operator as imparted to the tether device.

Also disclosed herein is a method for controlling an e-pallet, i.e., one having a superstructure mounted on or formed integrally with a base platform, and a tether device connected to the superstructure. The tether device defines an articulation angle with respect to a leading edge of the superstructure and is configured to be grasped at one end by a human operator when towing the e-pallet. The method in a possible implementation includes determining a set of input signals, including measuring an actual ground speed of the e-pallet, an articulation angle between the tether device and a leading edge of the superstructure, and a length of the e-pallet. In response to the input signals, the method includes generating a set of motor control signals using PID control logic of an electronic controller, with the PID control logic having a lateral dynamics control loop coupled with a longitudinal dynamics control loop respectively determining a desired yaw rate and a desired ground speed of the e-pallet.

In response to the desired yaw rate and ground speed, the method includes transmitting a set of motor control signals to an electric motor connected to two or more driven road wheels of the e-pallet to thereby cause the electric motor to provide a drive torque thereto, thereby accommodating for motion of the human operator that is imparted to the tether device.

In another aspect of the disclosure, an electronic controller for an e-pallet includes a processor and tangible non-transient memory on which instructions are recorded for controlling motion of the e-pallet when the e-pallet is towed by a human operator via a tether device. Execution of the instructions by the processor causes the processor to receive input signals inclusive of an actual ground speed of the e-pallet, an articulation angle between the tether device and a leading edge of the e-pallet, and a length of the tether device as measured by a speed sensor, an angle sensor, and a length sensor, respectively. Instruction execution also causes the processor(s) to generate a set of motor control signals in response to the input signals using PID control logic of the electronic controller. The PID control logic has a lateral dynamics control loop coupled with a longitudinal dynamics control loop, respectively determining a desired yaw rate and a desired ground speed of the e-pallet. Additionally, execution of the instructions causes the processor(s) to transmit the set of motor control signals to the at least one electric motors to cause the one or more electric motors to power the one or more driven road wheels of the e-pallet, thereby accommodating for motion of the human operator imparted to the tether device.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Figure 1:
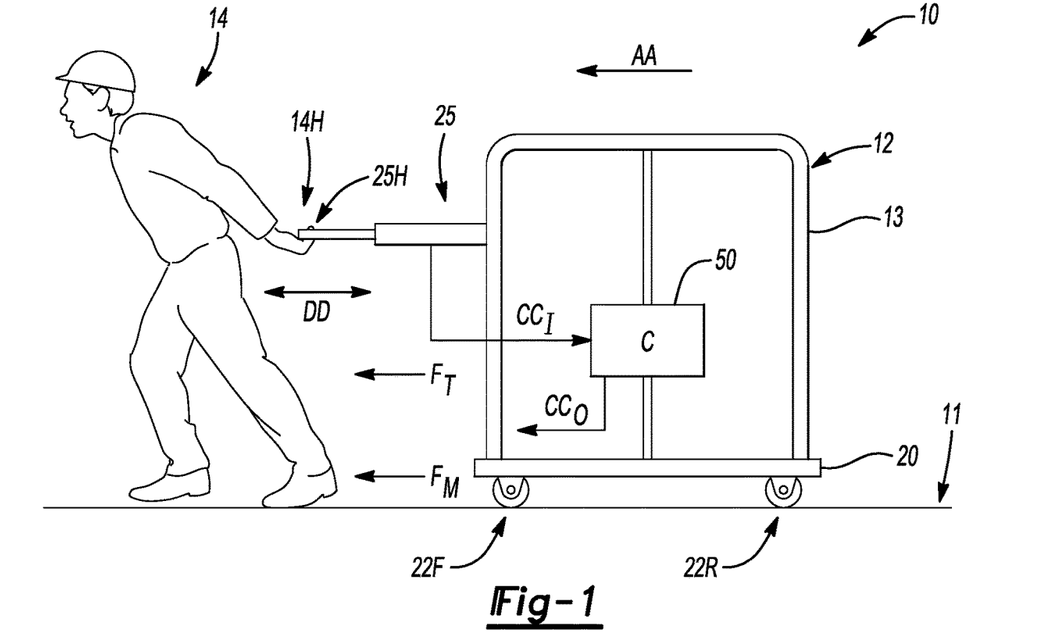
FIG. 1 is an illustration of a side view illustration of a representative motor-driven electric pallet ("e-pallet") constructed and controlled in accordance with the present disclosure.

Referring to the drawings, wherein like reference numbers refer to like features throughout the several views, and beginning with FIG. 1, a workspace 10 is shown in which a motor-driven electric pallet ("e-pallet") 12 is lightly tethered to a human operator 14 via a flexible tether device 25. The e-pallet 12 may be used in a wide range of facilities, such as but not limited to manufacturing plants, warehouses, supply depots, and schools, to assist the operator 14 in transporting a load within the workspace 10. Depending on the nature of the workspace 10 and of the various operations conducted therein, the load transported by the e-pallet 12 may have various sizes, shapes, and constructions, e.g., products, cargo, raw materials, partially-assembled or fully-assembled parts or components, food, beverages, or other consumables, mail, packages, or other such items that may have to be moved within the workspace 10.

In order to function in this manner, the e-pallet 12 is equipped with an onboard electronic controller (C) 50. The electronic controller 50 is mounted on or housed within a superstructure 13. The superstructure 13 may vary in its construction based on the transported load, but in general may embody a box-like container possibly including shelves, racks, bins, or other suitable structure for securely moving the load through the workspace 10. The superstructure 13 in turn is connected to or formed integrally with a base platform 20, e.g., a solid plate or planar surface of metal, plastic, and/or composite materials configured to support the collective weight of the electronic controller 50 and the above-described load. The base platform 20 in turn connected to one or more road wheels 22F and 22R, e.g., via drive axles and a suspension system (not shown).

In the representative use case of FIG. 1, the operator 14 grasps a handle 25H of the tether device 25 in the operator's hand 14H, with the tether device 25 in turn being pivotably and/or rotatably connected to the superstructure 13. The operator 14 pulls or tows the e-pallet 12 in the general direction of arrow AA as the operator 14 walks through the workspace 10. Imparted towing forces of the operator 14, represented by arrow $F_T$, are thus imparted to the e-pallet 12, thereby causing the e-pallet 12 to move relative to a floor surface 11. Depending on the relative speeds of the operator 14 and the e-pallet 12 with respect to the floor surface 11, the tether device 25 may extend or contract in length, as indicated in FIG. 1 by double-headed arrow DD. At the same time, the electronic controller 50 commands a motor assist force (arrow $F_M$) via delivery of a motor drive torque to one or more of the road wheels 22F and/or 22R for locomotion of the e-pallet 12. This action is performed, in response to input signals (arrow $CC_I$), by the transmission of motor control signals (arrow CCo) from the electronic controller 50, e.g., to corresponding motor control processors as appreciated in the art. The motor control signals (arrow CCo) within the scope of the present disclosure as explained in greater detail below include at least a desired yaw rate ($\omega_{des}$) and a desired ground speed ($V_{des}$) of the e-pallet, as set forth below with particular reference to FIGS. 6-8.

Figure 2:
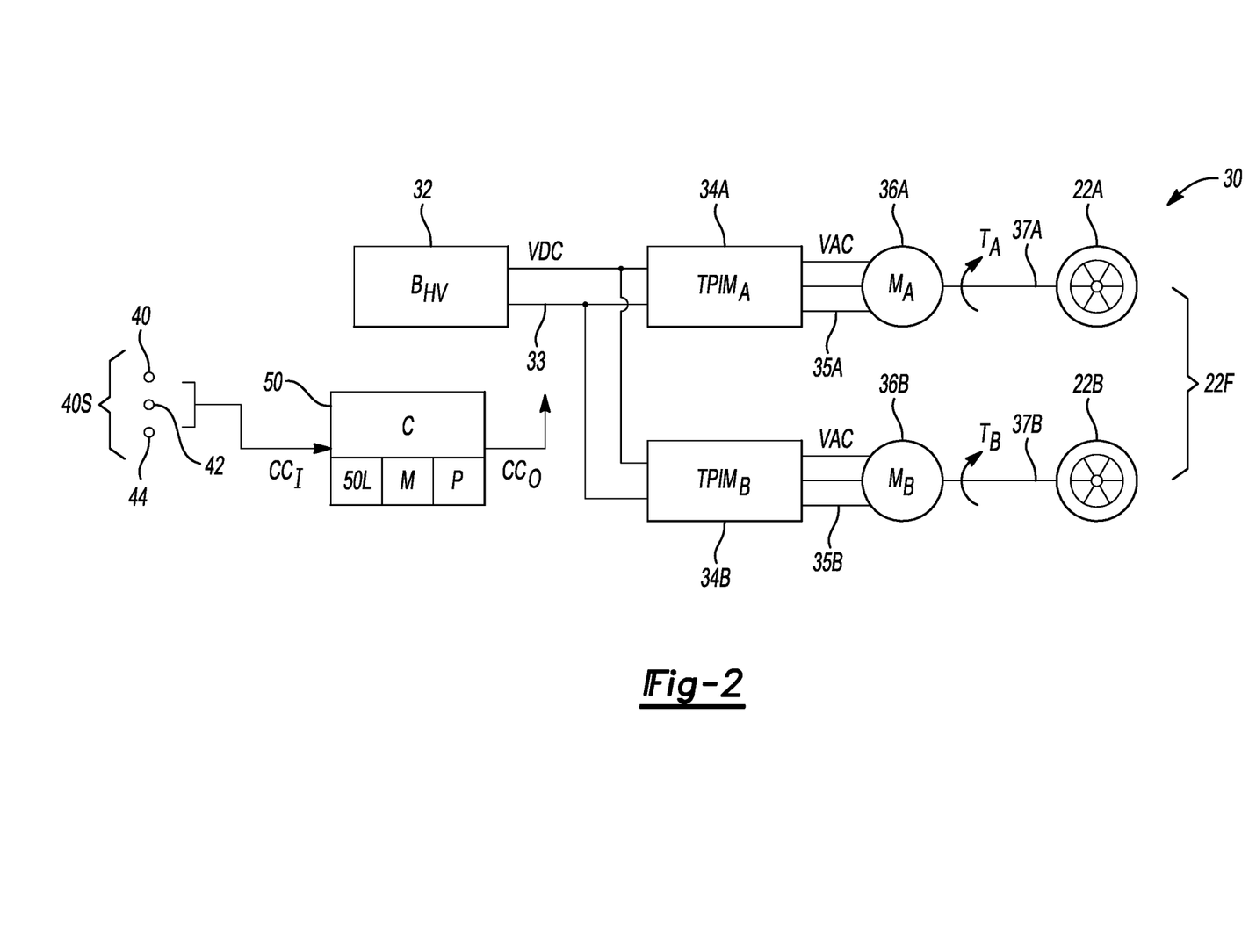
FIG. 2 is a schematic illustration of a powertrain usable as part of the e-pallet shown in FIG. 1.

Referring briefly to FIG. 2, the road wheels 22F may include respective first and second road wheels 22A and 22B, e.g., arranged to function as oppositely-disposed front road wheels of the e-pallet 12 when the e-pallet 12 is towed in the direction of arrow AA by the human operator 14. A powertrain system 30 in such a configuration may include a multi-cell battery pack ($B_{HV}$) 32, which in a representative configuration may be configured as a rechargeable multi-cell battery having a lithium-ion or other suitable battery chemistry. The powertrain system 30 of FIG. 2 also includes first and second traction power inverter modules ($TPIM_A$) 34A and ($TPIM_B$) 34B respectively connected to first and second electric motors (MA) 36A and (MB) 36B.

When the electric motors 36A and 36B are embodied as alternating current (AC)/polyphase traction motors as shown, the TPIMs 34A and 34B are connected to the battery pack 32 via a direct current voltage bus 33. The TPIMs 34A and 34B are also connected to the electric motors 36A and 36B, respectively, via corresponding AC voltage busses 35A and 35B. Internal switching operations of the TPIMs 34A and/or 34B in this representative configuration is used to convert a DC voltage (VDC) present on the DC voltage bus 33 into an AC voltage (VAC) on the AC voltage bus 35A and/or 35B as needed in order to electrically energize one or both of the electric motors 36A and 36B. Embodiments may also be conceived of in which the electric motors 36A and 36B are DC motors, in which case one may omit the TPIMs 34A and 34B and associated power conversion circuitry.

With respect to locomotion of the e-pallet 12 of FIG. 1, each road wheel 22A and 22B may be separately powered by a respective output torque, i.e., arrows $T_A$ and $T_B$. In such a configuration, the e-pallet 12 of FIG. 1 may employ differential steering, which in turn is accomplished by rotating the road wheels 22A and 22B via corresponding output members 37A and 37B at different torques or speeds relative to one another. The electronic controller 50 receives the input signals (arrow $CC_I$) from a sensor suite 40S inclusive of a length sensor 40, an angle sensor 42, and a speed sensor 44 as described below. When executing a left hand turn, for instance, the electronic controller 50 may command the output torque ($T_A$) from the electric motor 36A at a higher level than the output torque ($T_B$) from the electric motor 36B. A similar steering effect may be enjoyed using a single electric motor 36A or 36B using an associated electronic differential, as will be appreciated by those skilled in the art, and therefore the configuration of FIG. 2 is merely representative of one possible embodiment of the powertrain system 30.

Referring again to FIG. 1, and as described in detail herein with reference to FIGS. 3-8, the electronic controller 50 is configured, in response to the input signals (arrow $CC_I$), to generate the motor control signals (arrow CCo). The electronic controller 50 does so using a coupled proportional integral derivative (PID) control architecture in which a lateral control PID is coupled with a longitudinal control PID to control motion of the e-pallet 12 when acted on by the human operator 14 via the tether device 25. Resulting motion of the e-pallet 12 may vary in accordance with the particular manner in which the operator 14 acts on the tether device 25, e.g., whether or not the operator 14 swings his or her arms or holds them steady, and whether the operator 14 makes sharp turns or walks in a straight line. The possible motions of the operator 14 could impart different dynamic inputs to the e-pallet 12, and would thus necessitate different control actions in accordance with the present teachings.

Figure 3A:
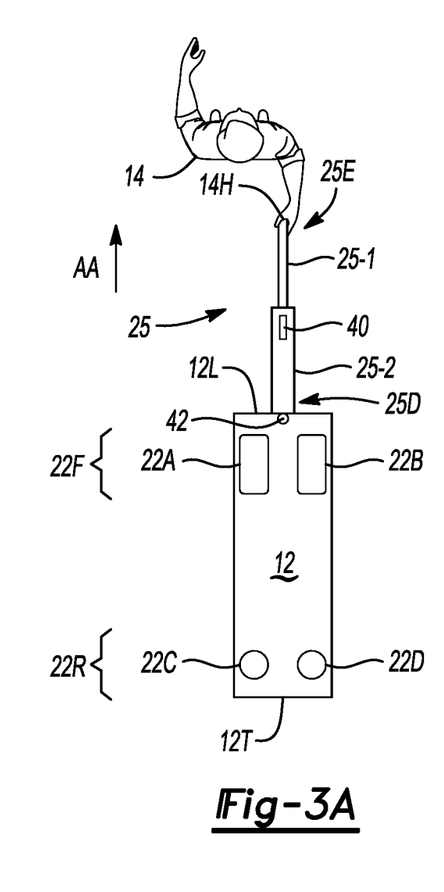
FIGS. 3A, 3B, and 3C illustrate three exemplary motion trajectories of the e-pallet shown in FIG. 1.
Figure 3B:
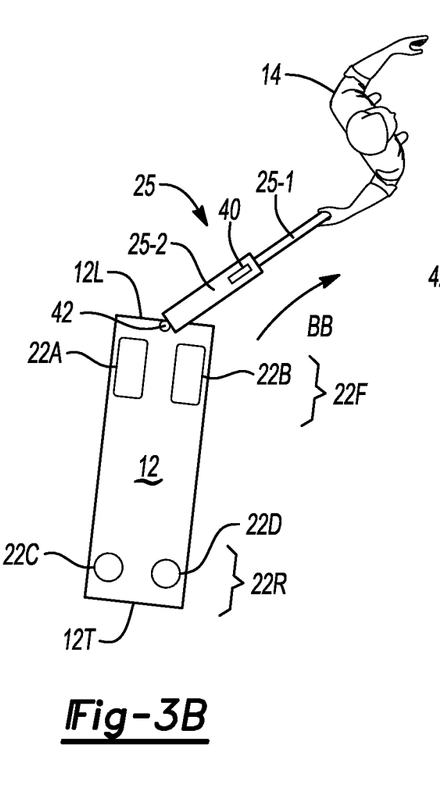
Figure 3C:
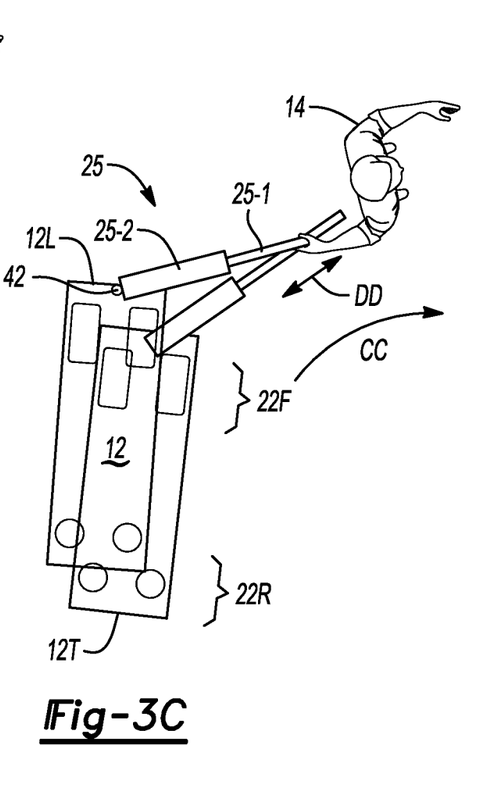

FIGS. 3A, 3B, and 3C show such exemplary motion trajectories for the e-pallet 12 when acted on via the human operator 14 by way of the tether device 25. The tether device 25 in contemplated embodiments may be a flexible telescoping mechanism having, in the illustrated configuration, a proximal section 25-1 terminating in a proximal end 25E, with "proximal" being relative to the position of the operator 14. The proximal section 25-1 may be surrounded by a distal section 25-2 as shown, such that the proximal section 25-1 is extendable from the distal section 25-2 when the operator 14 pulls or urges the proximal section 25-1 in the direction of arrow AA while towing the e-pallet 12. Likewise, the proximal section 25-1 is received within the distal section 25-2 when the operator 14 is moving more slowly than the e-pallet 12, or when the operator 14 pushes on the proximal section 25-1 to arrest forward motion of the e-pallet 12. As an integral part of the tether device 25, or alternatively as an add-on component, the length sensor 40 measures and reports the deployed length of the tether device 25 for use by the electronic controller 50 of FIG. 1 in controlling motion of the e-pallet 12.

FIG. 3A represents "straight line" motion of the e-pallet 12. In the simplified plan view depiction, the e-pallet 12 is rectangular in shape, with a leading edge 12L and a trailing edge 12T. The human operator 14 grasps the proximal end 25E of the tether device 25 in hand 14H and walks at a steady pace in the general direction of arrow AA. As this occurs, the electronic controller 50 regulates the respective output torques ($T_A$ and $T_B$) of the electric motors 36A and 36B transmitted to the corresponding road wheels 22A and 22B, which act as the front road wheels 22F in this arrangement. The rear road wheels 22R, i.e., 22C and 22D, in a possible front wheel drive embodiment are freewheeling devices such as casters located proximate the trailing edge 12T of the e-pallet 12. In this manner the electronic controller 50 ensures that the e-pallet 12 follows the operator 14 at a particular following distance.

When the operator 14 begins to turn, as represented by arrow BB of FIG. 3B, and does so without accompanying hand motion or pronounced arm swinging, the electronic controller 50 of FIG. 1 causes the e-pallet 12 to trail the operator 14 based on the following distance and a measured angle of articulation between the distal end 25D of the tether device 25 and the e-pallet 12, e.g., the superstructure 13 thereof (see FIG. 1). Such an angle, which is referred to hereinafter as the articulation angle and abbreviated hereinbelow as $\theta$, is measured by the angle sensor 42 disposed between the tether device 25 and the leading edge 12L. The articulation angle ($\theta$) is then reported to the electronic controller 50 over a suitable hardwired transfer conductors or a wireless connection, e.g., a short distance BLUETOOTH®, Wi-Fi, or near-field communication (NFC) link. Additional control actions are taken to compensate for hand motion and/or arm swinging of the operator 14 to prevent inadvertent jackknifing or tipping of the e-pallet 12, as represented by arrow CC in FIG. 3C. Thus, the electronic controller 50 is informed in real time by the above-noted length of the tether device 25 and the measured articulation angle ($\theta$) across a range of possible actions and motions of the operator 14.

Figure 4:
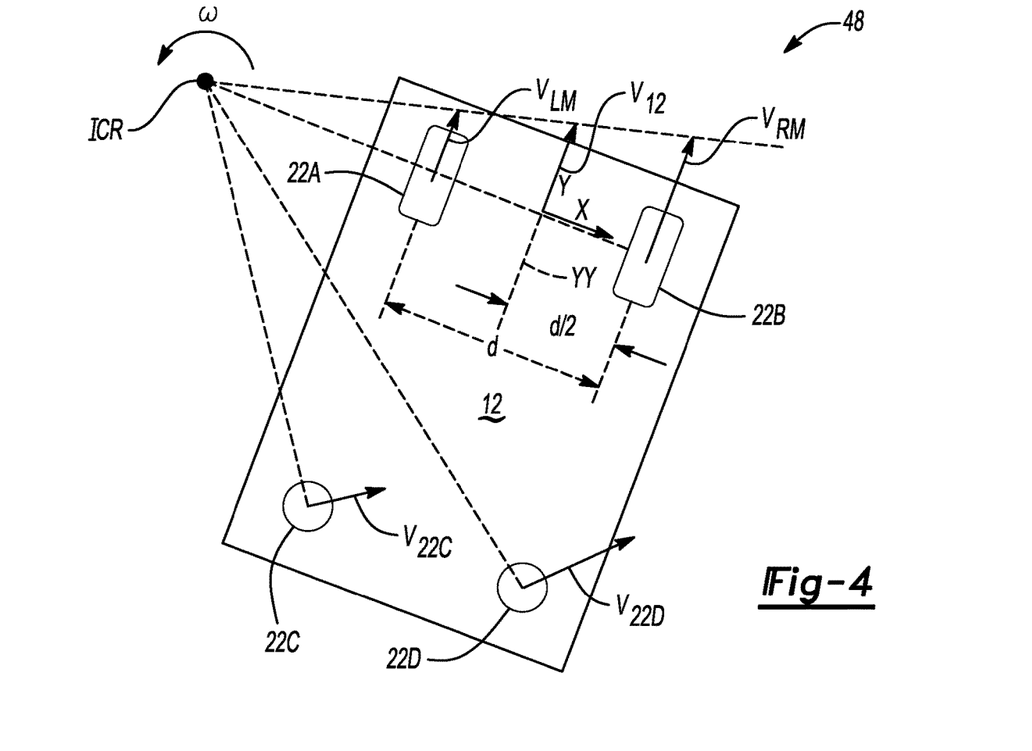
FIG. 4 is a schematic illustration of representative kinematics of the e-pallet shown in FIG. 1.

E-PALLET KINEMATICS: referring briefly to FIG. 4, a kinematic diagram 48 illustrates relevant parameters for consideration by the electronic controller 50 of FIGS. 1 and 2 when performing the present control strategy. The e-pallet 12, which is shown in plan view in a nominal two-dimensional Cartesian xy coordinate frame and having a longitudinal centerline YY, includes the two powered road wheels 22A and 22B, which in turn are separated from each other by a distance (d). Thus, the distance between a given road wheel 22A or 22B and the centerline YY is d/2. Casters or non-powered/passive wheels may be used for the remaining road wheels 22C and 22D, as noted above, with corresponding velocity components $V_{22C}$ and $V_{22D}$. In the representative FIG. 4 orientation, the road wheels 22A and 22B are respectively powered by a right motor and a left motor, i.e., the electric motors 36A and 36B of FIG. 2, with "right" and "left" being relative to a nominal forward-facing driving position of the operator 14. The respective motor velocities are thus represented by arrows $V_{LM}$ and $V_{RM}$, which combine to produce a linear velocity ($V_{12}$) of the e-pallet 12. The e-pallet 12 may also have a yaw rate ($\omega$) about an instant center of rotation (ICR) as a point in free space, as understood in the art.

With continued reference to the representative diagram 48, the velocity ($V_{12}$) of the e-pallet 12 may be expressed mathematically as $V_{12}=\sqrt{\dot{x}^2+\dot{y}^2}$, with the yaw rate ($\omega$)=$\dot{\theta}$.

Additionally:

$$V_{12} = \frac{V_{LM} + V_{RM}}{2}$$

$$\omega = \frac{V_{RM} - V_{LM}}{d}$$

$$\begin{bmatrix} V_{RM} \\ V_{LM} \end{bmatrix} = \begin{bmatrix} 1/2 & 1/2 \\ \frac{1}{d} & -\frac{1}{d} \end{bmatrix}^{-1} \begin{bmatrix} V_{12} \\ \omega \end{bmatrix}$$

$$\begin{bmatrix} V_{12} \\ \omega \end{bmatrix} = \begin{bmatrix} 1/2 & 1/2 \\ \frac{1}{d} & -\frac{1}{d} \end{bmatrix} \begin{bmatrix} V_{RM} \\ V_{LM} \end{bmatrix}$$

$$\begin{bmatrix} \dot{x} \\ \dot{y} \\ \dot{\theta} \end{bmatrix} = \begin{bmatrix} \cos\theta \\ \sin\theta \\ 0 \end{bmatrix} v + \begin{bmatrix} 0 \\ 0 \\ 1 \end{bmatrix} \omega$$

Ultimately, the velocities of the left and right motors, i.e., the electric motors 36A and 36B, are expressed as functions of the velocity ($V_{12}$), the yaw rate ($\omega$), and the distance (d) between the road wheels 22A and 22B:

$$V_{LM} = V_{12} - \frac{\omega d}{2}$$

$$V_{RM} = V_{12} + \frac{\omega d}{2}$$

The kinematic diagram 48 of FIG. 4 therefore represents a particular configuration of the e-pallet 12, one in which front steering is achieved in an exemplary instance via differential speeds of the road wheels 22A and 22B. Other embodiments may be contemplated within the scope of the present disclosure that use different versions of the kinematic diagram 48, such as embodiments in which the road wheels 22A and 22B are steerable using a steering assembly, and therefore the representation of FIG. 4 is intended to be illustrative of just one possible implementation.

Figure 5:
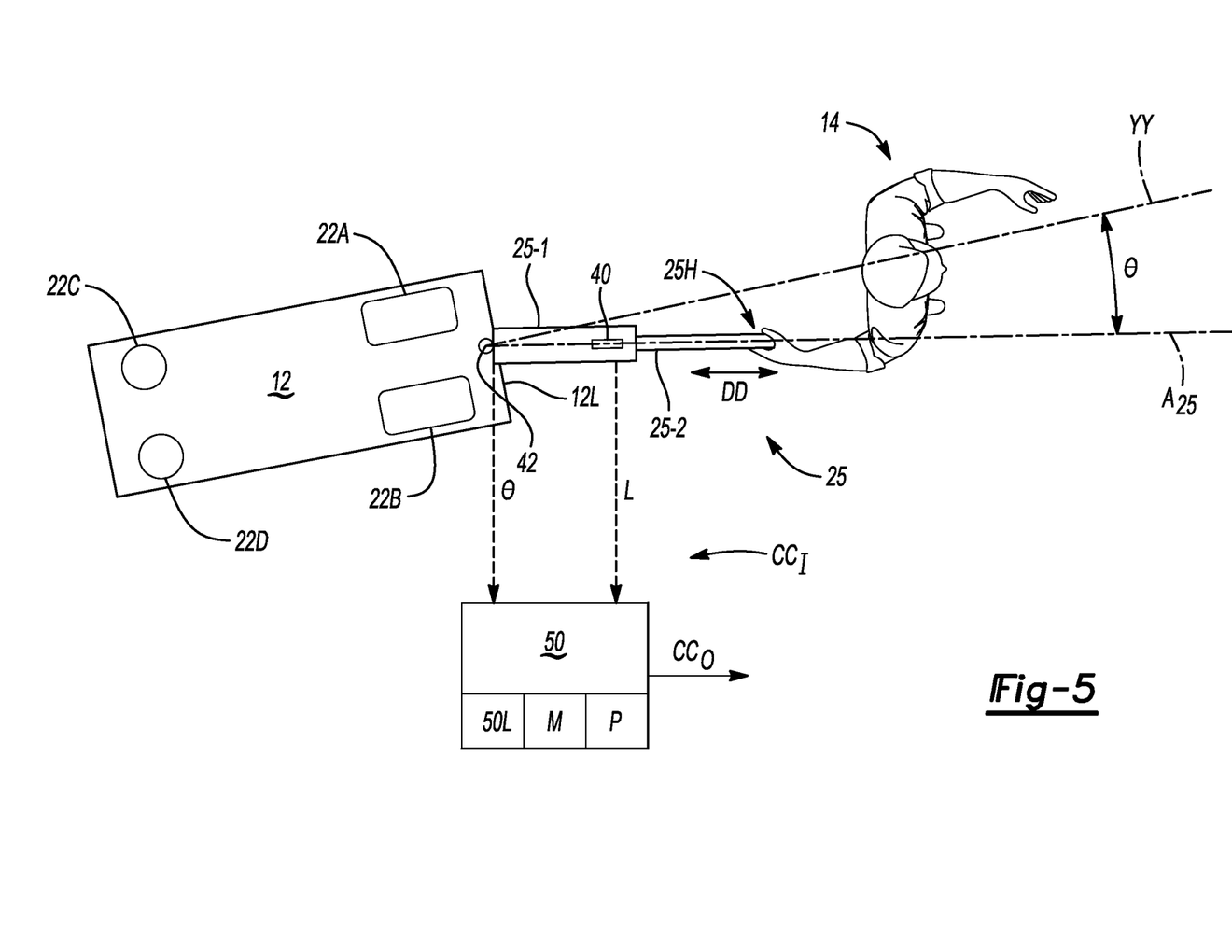
FIG. 5 illustrates an electronic controller and an associated e-pallet, with the electronic controller being in communication with other components of the e-pallet and configured to execute the present control method.

Referring now to FIG. 5, the human operator 14 is again depicted in the act of towing the e-pallet 12, with the e-pallet 12 providing at least some of the requisite motive power via the electric motors 36A and 36B of FIG. 2 and corresponding road wheels 22A and 22B. As noted above, the electronic controller 50 is informed by the input signals (arrow $CC_I$), including two measurements from the tether device 25: (i) the articulation angle ($\theta$) as measured and output by the angle sensor 42, which describes the angular orientation of the tether device 25 relative to the leading edge 12L of the e-pallet 12, or more precisely the angle between the longitudinal center axis YY and a longitudinal center axis $A_{25}$ of the tether device 25, and (ii) the length (L) of the tether device 25 as measured reported by the length sensor 40 disposed within the tether device 25.

In a possible configuration, the angle sensor 42 may include a rotary position sensor, e.g., a resolver or an encoder, which is capable of outputting the articulation angle ($\theta$) as an electronic signal interpretable by the electronic controller 50 as an angular value. For instance, the angle sensor 42 may output a sine or cosine waveform as appreciated in the art, with the electronic controller 50 configured to track and interpret such a signal as a corresponding angular value. The length sensor 40 for its part may be embodied as a string potentiometer or another suitable linear position sensor similarly capable of outputting the length (L) as an electronic signal interpretable by the electronic controller 50 as the linear distance between the operator 14 and the leading edge 12L of the e-pallet 12.

In order to perform the various motion control functions of a corresponding method, which will now be described with reference to FIGS. 6, 7, and 8, the electronic controller 50 is programmed with control logic 50L and equipped with application-specific amounts of volatile and non-volatile memory (M) and one or more processor(s) (P). The memory (M) includes or is configured as a non-transitory computer readable storage device(s) or media, and may include volatile and nonvolatile storage in read-only memory (ROM) and random-access memory (RAM), and possibly keep-alive memory (KAM) or other persistent or non-volatile memory for storing various operating parameters while the processor (P) is powered down. Other implementations of the memory (M) may include, e.g., flash memory, solid state memory, PROM (programmable read-only memory), EPROM (electrically PROM), and/or EEPROM (electrically erasable PROM), and other electric, magnetic, and/or optical memory devices capable of storing data, at least some of which is used in the performance of the method 100. The processors (P) may include various microprocessors or central processing units, as well as associated hardware such as a digital clock or oscillator, input/output (I/O) circuitry, buffer circuitry, Application Specific Integrated Circuits (ASICs), systems-on-a-chip (SoCs), electronic circuits, and other requisite hardware needed to provide the programmed functionality. In the context of the present disclosure, the electronic controller 50 executes instructions via the processor(s) (P) to cause the electronic controller 50 to perform the present method.

Computer-readable non-transitory instructions or code embodying the method and executable by the electronic controller 50 may include one or more separate software programs, each of which may include an ordered listing of executable instructions for implementing the stated logical functions described below. Execution of the instructions by the processor (P) in the course of operating the e-pallet 12 causes the electronic controller 50 to regulate motion of the e-pallet 12 as the e-pallet 12 is pulled by the human operator 14.

Figure 6:
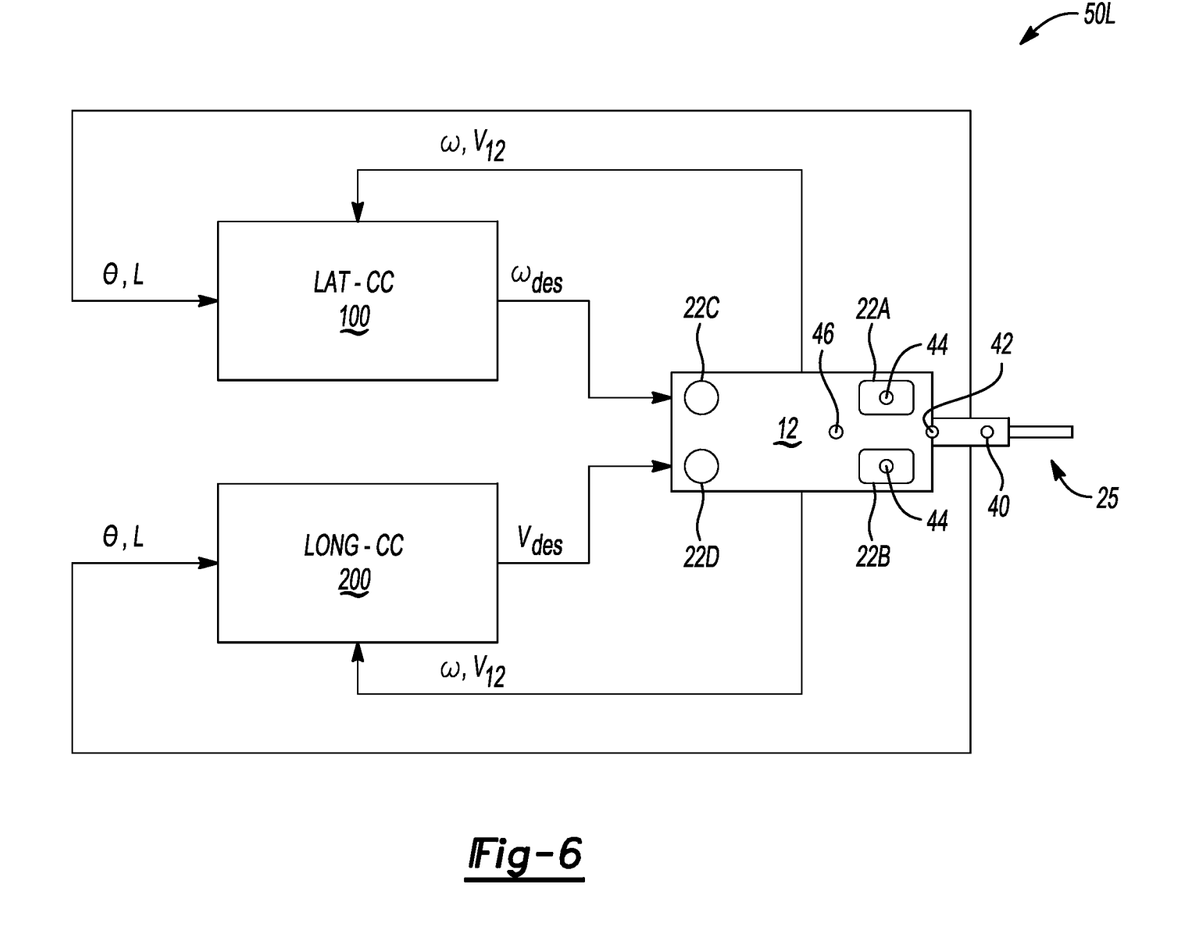
FIG. 6 is a top-level control diagram of coupled longitudinal and lateral proportional-integral (PI) controllers for use aboard the representative e-pallet of FIG. 1.

FIG. 6 in particular depicts a schematic top-level implementation of the control logic 50L. Lateral and longitudinal controls portions of the control logic 50L are discussed below with reference to FIGS. 7 and 8, respectively. As noted above, the exemplary solutions presented herein combine longitudinal and lateral controls of the e-pallet 12 into a single control loop for the purpose of more closely matching natural movements and arm swinging actions of the human operator 14 of FIG. 1, with the ultimate goal of optimizing motion and stability performance of the e-pallet 12. The control logic 50L shown in FIG. 6 may be encoded or programmed as computer readable instructions that are executable by the electronic controller 50 of FIGS. 1, 2, and 5, for the purpose of optimizing motion stability and smoothness of the e-pallet 12, regardless of the actions of the operator 14. The described approach corrects yaw of the e-pallet 12 based on a non-linear function of the speed of the e-pallet 12, as well as the measured length (L) of the tether device 25.

The control logic 50L of FIG. 6 includes a lateral dynamics control block ("LAT-CC") 100 and a longitudinal dynamics control block ("LONG-CC") 200, with "blocks" in this instance referring to a collective set of software or algorithm-based control functions governing dynamic control of the e-pallet 12. Both of the blocks 100 and 200 receive the above-described articulation angle ($\theta$) and the length (L) of the tether mechanism 25 as measured by the respective angle sensor 42 and length sensor 40 depicted in FIG. 2. Additional inputs to blocks 100 and 200 include an actual yaw rate (ω) and the actual speed ($V_{12}$), i.e., the calculated or measured ground speed of the e-pallet 12, with the actual yaw rate (ω) and actual pallet speed ($V_{12}$) respectively describing the lateral and longitudinal dynamic state of the e-pallet 12.

The actual speed ($V_{12}$) in a particular non-limiting example may be determined by measuring the rotational speeds of the driven road wheels 22A and 22B, e.g., using wheel speed sensors 44, and then calculating the resulting speed ($V_{12}$) from such values as explained above with reference to the kinematic diagram 48 of FIG. 4. In this embodiment, the road wheels 22C and 22D are passively freewheeling devices, i.e., unpowered by a corresponding prime mover. Although the actual yaw rate (ω) could be measured using an optional yaw rate sensor 46, e.g., an inertial measurement unit, the actual yaw rate (ω) could be calculated in real time in the alternative based on the time rate of change of the measured articulation angle (θ) as set forth above and appreciated in the art, or calculated using the wheel speed sensors and a kinematic model of the e-pallet 12, e.g., the kinematic diagram 48.

Figure 7:
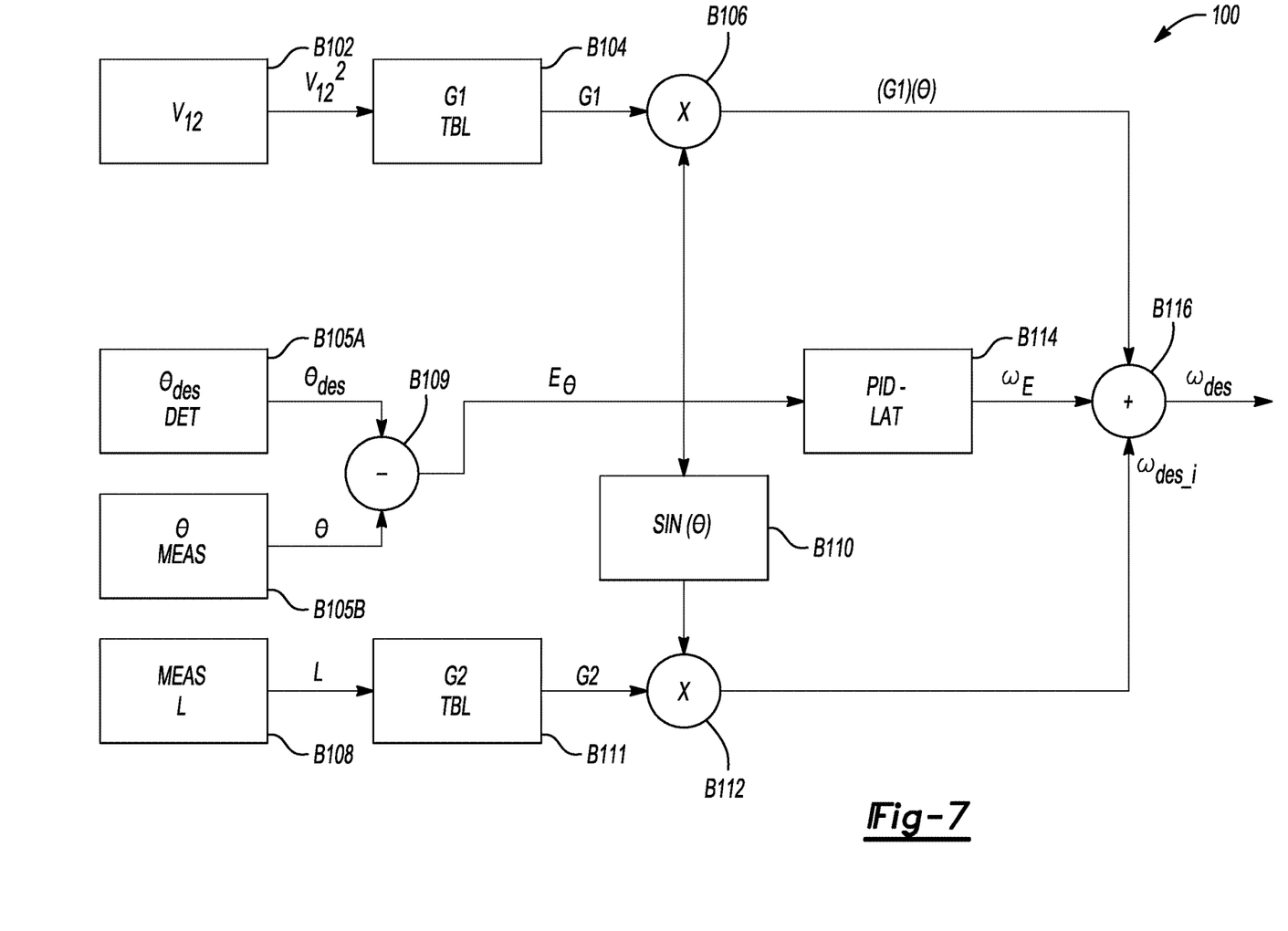
FIGS. 7 and 8 are schematic illustrations of representative control logic suitable for implementing lateral and longitudinal control actions, respectively, within the framework of FIG. 6.
Figure 8:
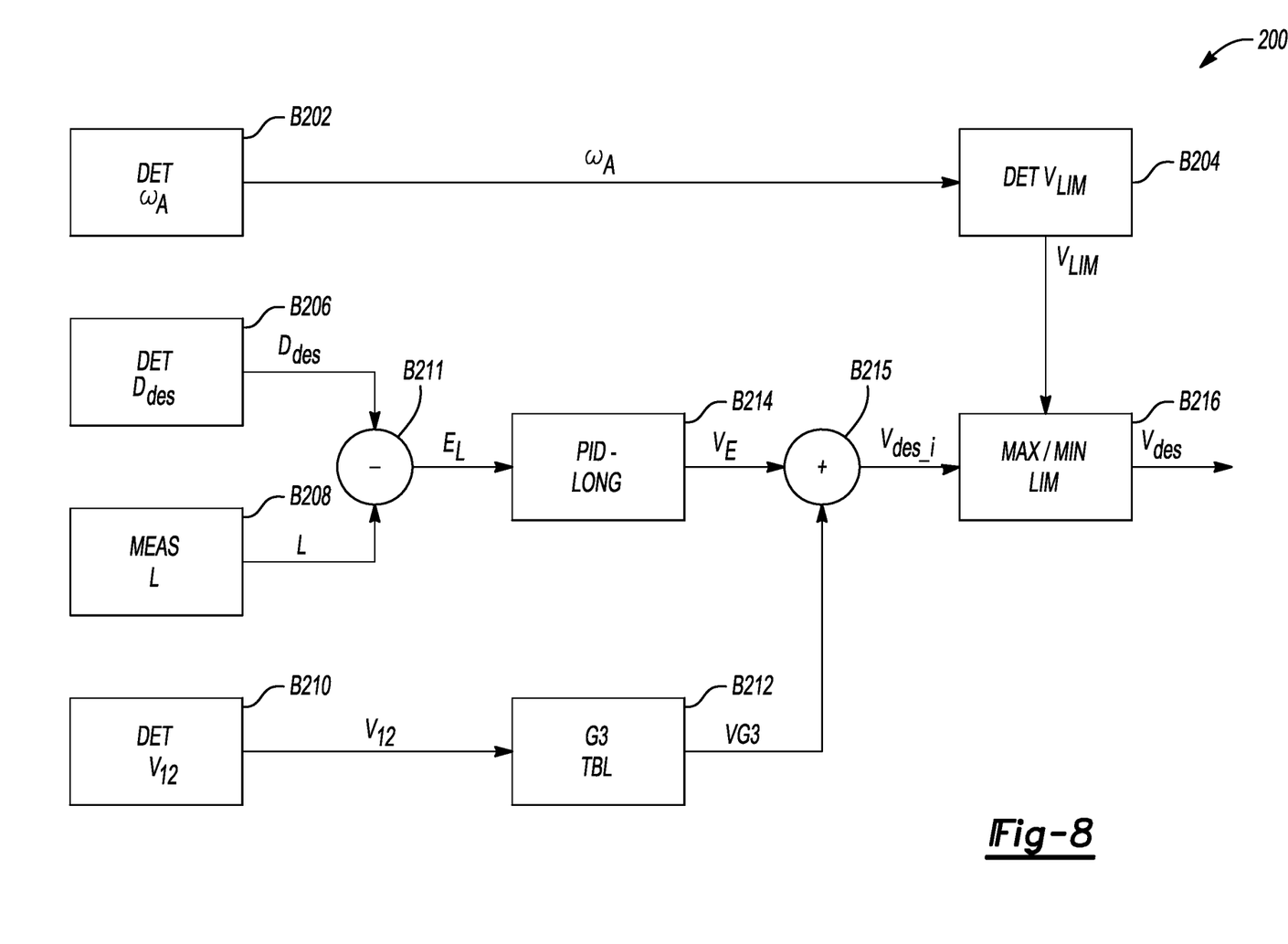

The lateral and longitudinal dynamics control blocks 100 and 200, exemplary embodiments of which are shown in FIGS. 7 and 8, individually process the actual yaw rate (ω), the speed ($V_{12}$) of the e-pallet 12, the articulation angle (θ), and the length (L), with the electronic controller 50 doing so using the processor(s) (P) depicted in FIG. 2. Thereafter, the lateral dynamics control block 100 of FIG. 6 outputs a desired pallet yaw rate ($\omega_{des}$). At the same time, the longitudinal control block 200 outputs a desired speed ($V_{des}$). The electronic controller 50, through switching control operation of the TPIMs 34A and/or 34B and the resulting power feed to the electric motors 36A and 36B shown in FIG. 2, thereafter modifies the output torques/speeds of the electric motors 36A and 36B to produce a desired lateral and longitudinal dynamic response.

LATERAL CONTROL: referring to FIG. 7, the lateral dynamics control logic block 100 of FIG. 6 may be implemented as proportional-integral-derivative (PID) loop as shown. Beginning with logic block B102, the electronic controller 50 of FIG. 5 squares the actual speed ($V_{12}$) noted above and outputs this value ($V_{12}^2$) to a first gain logic block B104. A purpose of performing this function in block B102 is to ensure that a subsequent numeric gain applied at a logic block B104 is non-linear. Thus, other non-linear functions may be applied by logic block B104 without departing from the intended inventive scope.

The first logic gain block B104 entails determining a numeric gain value (G1) to apply, based on the value from logic block B102. For instance, the electronic controller 50 may access a calibrated lookup table ("G1 TBL") from its resident memory (M) and thereafter extract a numeric gain value (G1) corresponding to the value ($V_{12}^2$), which is then fed into a multiplication logic block B106. For the depicted implementation, such a numeric gain value may be stated in reciprocal seconds, i.e., 1/s.

Block B105A ("DET $\theta_{des}$") entails determining an angular reference or setpoint value for the articulation angle, with such a value represented as ($\theta_{des}$) in FIG. 7 for added clarity. The setpoint value ($\theta_{des}$) is then communicated to an angular error calculation block B109.

At block B105B ("MEAS θ"), the articulation angle (θ) is measured using the above-described angle sensor 42 shown in FIG. 2. The measured articulation angle (θ), e.g., in radians, is then fed into error calculation block B109.

At block B106, an error value ($E_\theta$) in radians from the error calculation block B109 is multiplied by the numeric gain value (G1) from logic block B104. The product, i.e., (G1) (θ), is thus stated in radians/second (rad/s) in this implementation, with the product communicated to a summation logic block B116 as described below.

Logic block B108 ("MEAS L") entails measuring the length (L) of the tether device 25 shown in FIG. 1. Such a measurement may be performed by the length sensor 40 (see FIG. 2), which as described above is integral with or attached to the tether device 25. The measured length (L) is then communicated to a second gain logic block B111 for processing thereby.

Still referring to FIG. 7, the error calculation block B109 is used to calculate the difference between the angular setpoint value ($\theta_{des}$) from logic block B105A and the measured articulation angle (θ) from logic block B105B. Block B109 then outputs the difference as an angle error value ($E_\theta$), stated in radians. Within the context of the lateral dynamics control logic block 100, the angle error value ($E_\theta$) is communicated to blocks B106, B110, and B114.

Block B110 entails determining the geometric sine of the error value ($E_\theta$), i.e., sin (θ). Block B110 may alternatively calculate the cosine depending on the manner in which the error value ($E_\theta$) is defined, as will be appreciated in the art, and therefore block B110 may alternatively calculate the cosine of the error value ($E_\theta$). The calculated value, in this instance sin (θ), is then fed into the multiplier block B112.

The second gain block B111, which operates analogously to the first gain block B104 described above, entails determining a numeric gain value (G2) to apply based on the measured length (L) of the tether device 25 from logic block B108. For instance, with the length (L) specified in meters (m), a calibrated lookup table (G2 TBL) may be populated with calibrated gain values having units (1/(m·s)), which will output the gain (G2) in reciprocal seconds, i.e., 1/s. The gain (G2) is then fed into a multiplication block B112.

Block B112 is used to multiply the outputs of blocks B110 and B111. The product G2·sin (θ) is an initial desired yaw rate ($\omega_{des\_i}$) in rad/s is then fed into the summation block B116 for further processing.

Block B114 ("PID-LAT") of the lateral dynamics control block 100 shown in FIG. 7 receives the angle error value ($E_\theta$) from logic block B109 as described above, and thereafter applies a proportional gain. The output of block B114 is a yaw rate error ($\omega_E$), which may be expressed in rad/s. The yaw rate error ($\omega_E$) is then provided to the summation block B116.

At summation block B116, the electronic controller 50 next adds the outputs of logic blocks B106, B112, and B114 to determine the desired yaw rate ($\omega_{des}$). The desired yaw rate ($\omega_{des}$) is thereafter used by the electronic controller 50 of FIGS. 1 and 2, along with a desired velocity ($V_{des}$) of FIG. 8, to regulate a commanded output torque or speed of the electric motors 36A and 36B in the overall motion control of the e-pallet 12.

LONGITUDINAL CONTROL: referring now to FIG. 8, the longitudinal control logic block 200 shown in the top-level view of FIG. 6 may be implemented as another PID loop as shown. Beginning with block B202 ("DET $\omega_A$"), the controller 50 determines the actual yaw rate ($\omega_A$) of the e-pallet 12. As noted above, this action may entail performing a direct measurement via an inertial measurement unit or another suitable yaw rate sensor 46, as shown in FIG. 6, or the actual yaw rate ($\omega_A$) may be calculated in real time by the electronic controller 50. The actual yaw rate ($\omega_A$) is then fed into a maximum speed logic block ("DET $V_{LIM}$") B204 for further processing.

Block B204 of FIG. 8 entails determining a maximum rotary speed ($V_{LIM}$) of each of the electric motors 36A and 36B of FIG. 2 based on the current torque capacity of each, i.e., based on existing current, voltage, temperature, or other hardware limits as appreciated in the art. For instance, block B204 might include accessing a lookup table indexed or referenced by the actual yaw rate ($\omega_A$) and thereafter returning the initial speed limit ($V_{LIM}$). The purpose of block B204 is to prevent instability or rollover of the e-pallet 12 by enforcing a maximum speed, in this case the forward ground speed ($V_{12}$) of the e-pallet 12 provided by the road wheels 22A and 22B of FIG. 2. The initial speed limit ($V_{LIM}$) is then fed into logic block B216. As set forth above, the ground speed ($V_{12}$) of the e-pallet 12 is ultimately determined by the corresponding rotary speeds of the electric motors 36A and 36B of FIG. 2.

At logic block B206 ("DET $D_{des}$"), the electronic controller 50 determines the desired distance ($D_{des}$) between the operator 14 and e-pallet 12 depicted in FIG. 1. This value may be determined by calibration, e.g., as a calibrated setpoint. The desired distance ($D_{des}$) from block B206 is then fed into an error calculation block B211.

Block B208 ("MEAS L") of FIG. 8 includes measuring the current length (L) of the tether device 25 described above. Block B208 may entail using the length sensor 40 of the tether device 25, as best shown in FIG. 6, to measure the current axial length of the tether device 25, and to report the measured length (L) to the electronic controller 50. As with the desired distance ($D_{des}$) of block B206, the length (L) is thereafter fed into the error calculation block B211.

Continuing the discussion of the representative embodiment of logic block 200 of FIG. 8, logic block B210 ("DET $V_{12}$") includes determining the actual ground speed ($V_{12}$) of the e-pallet 12 described herein. When using individual wheel speed sensors 44 on the road wheels 22A and 22B as shown in FIG. 6, logic block B210 may include calculating the ground speed ($V_{12}$) of the e-pallet 12 using individually reported wheel speeds, as appreciated in the art. The actual ground speed ($V_{12}$), e.g., in meters per second (m/s) is then provided to a numeric gain block B212 for further processing.

At block B211, the electronic controller 50 calculates a difference between the desired distance ($D_{des}$), i.e., the setpoint from block B206, and the measured length (L) provided via length sensor 40 in block B208. The result is a length error ($E_L$) in meters (m) that is fed into a PID logic block B214 for further processing as set forth below.

The numeric gain block B212 used by the electronic controller 50 may entail a calibrated gain table (G3 TBL) stored in memory (M). Block B212 in such an implementation includes extracting a corresponding gain value. The actual ground speed ($V_{12}$) is multiplied by the gain value (G3), with the product being a modified speed value (VG3) in m/s that is fed into a summation block B215.

PID block B214 of FIG. 7 ("PID-LONG") receives the error value ($E_L$) from logic block B211 and applies a proportional gain to thereby generate an initial speed error ($V_E$). Block B214 may include referencing a lookup table indexed by the error value ($E_L$), and extracting the speed error ($V_E$) therefrom, e.g., in m/s. This value is then provided to summation block B215.

At summation block B215, the speed error ($V_E$) from block B214 is added to the modified speed value (VG3) from logic block B212 to calculate an initial desired speed ($V_{des\_i}$). This value is then fed into a speed limiting block B216 for further processing.

With continued reference to FIG. 7, the speed limiting block B216 ("MAX/MIN LIM") employed herein is configured to help prevent rollover of the e-pallet 12. In order to do so, the electronic controller 50 at block B216 receives the initial speed limit ($V_{LIM}$) from logic block B204 and the modified speed value (VG3) from logic block B215. The speed limiting block B216 is then used to apply calibrated maximum and minimum limits to the initial speed limit ($V_{LIM}$) based on the desired speed ($V_{des}$). The desired speed ($V_{des}$) is thereafter used by the electronic controller 50 of FIGS. 1 and 2, along with the desired yaw rate ($\omega_{des}$) derived as explained above with reference to FIG. 7, to regulate commanded output torque or speed of the electric motors 36A and 36B in the overall motion control of the e-pallet 12.

That is, block B216 is informed by block B204 of the maximum allowable speed of the e-pallet 12 based on the yaw rate ($\omega$) and the present capacities of the electric motors 36A and 36B, as noted above. This value, i.e., the initial speed limit ($V_{LIM}$), is then further limited based on the desired speed ($V_{des}$) from summation block B215, with the desired speed ($V_{des}$) being derived by the electronic controller 50 using the measured length (L) of the tether device 25 and the desired distance ($D_{des}$). In this manner, the ground speed ($V_{12}$) of the e-pallet 12 is closely regulated in the presence of possible hand and/or arm motions of the operator 14 based on the speed and yaw rate of the e-pallet 12. The electronic controller 50 is thus able to maintain stability, thereby avoiding rollover events or jack knifing of the e-pallet 12, while at the same time maintaining proper spacing between the e-pallet 12 and the operator 14 as captured by the desired distance ($D_{des}$).

The control logic 50L of FIG. 6 using coupled lateral and longitudinal dynamics control blocks 100 and 200, examples of which are shown in FIGS. 7 and 8, is therefore usable by the electronic controller 50 of FIG. 2 to maintain spacing and a stable speed of the e-pallet 12 as set forth in detail above. As part of the present control strategy, the actual ground speed ($V_{12}$) of the e-pallet 12 may be used to modify a yaw rate command aboard the e-pallet 12. The described velocity feedback is used to make the response more robust to motions of the operator 14, in particular arm swinging or other hand motions imparted by the operator 14 as the operator 14 tows the e-pallet 12 via the tether device 25. The present teachings also contemplate limiting the speed ($V_{12}$) based on the current capability of the electric motors 36A and 36B. These and other attendant benefits will be readily appreciated by those skilled in the art in view of the foregoing disclosure.

Likewise, those skilled in the art will appreciate that embodiments may be envisioned in which the electronic controller 50 is configured to execute the above-described method 100. For instance, the electronic controller 50 may include one or more processors (P) as shown in FIGS. 1 and 2, along with tangible non-transient memory (M) on which instructions are recorded for controlling motion of the e-pallet 12 when the e-pallet 12 is towed by the human operator 14 via the tether device 25. In such an implementation, execution of the instructions by the processor(s) (P) causes the processor(s) (P) to receive the input signals (arrow $CC_I$) inclusive of the actual ground speed ($V_{12}$) of the e-pallet 12, the articulation angle ($\theta$) between the tether device 25 and the leading edge 12L of the e-pallet 12, e.g., its superstructure 13 as shown in FIG. 1, and the length (L)

of the tether device 25 as measured by the speed sensor(s) 44, the angle sensor 42, and the length sensor 40, respectively.

Execution of the instructions in this implementation causes the processor(s) (P) to generate the set of motor control signals (arrow CCo) in response to the input signals (arrow CC$_I$) using the PID control logic 50L of FIG. 6, with the PID control logic 50L having a lateral dynamics control loop 100 coupled with a longitudinal dynamics control loop 200 respectively determining the desired yaw rate ($\omega_{des}$) and the desired ground speed (V$_{des}$) of the e-pallet 12. Execution of the instructions also causes the electronic controller 50 to transmit the set of motor control signals (arrow CCo) to the electric motor(s) 36A and/or 36B of FIG. 2 to cause the electric motors 36A and/or 36B to power the driven road wheels 22A and/or 22B of the e-pallet 12, thereby accommodating for motion of the human operator imparted to the tether device 25.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. An electronic pallet (e-pallet) comprising:
   a base platform having a superstructure mounted thereon or formed integrally therewith;
   a tether device connected to the superstructure, wherein the tether device defines an articulation angle with respect to a leading edge of the superstructure and is configured to be grasped at one end by a human operator when towing the e-pallet;
   a plurality of road wheels connected to the base platform, wherein one or more of the road wheels are driven road wheels;
   an electric motor operatively connected to the driven road wheels and configured to transmit a drive torque thereto in response to motor control signals, the motor control signals including at least a desired yaw rate and a desired ground speed of the e-pallet;
   a sensor suite comprising a speed sensor, an angle sensor, and a length sensor respectively configured to determine an actual ground speed of the e-pallet, the articulation angle, and a length of the tether device; and
   an electronic controller in communication with the sensor suite and configured, in response to input signals inclusive of the actual ground speed, the articulation angle, and the length, to generate the motor control signals using proportional-integral-derivative (PID) control logic, the PID control logic having coupled lateral and longitudinal dynamics control loops respectively determining the desired yaw rate and the desired ground speed of the e-pallet, thereby accommodating for motion of the human operator imparted to the tether device, wherein the lateral dynamics control loop is configured to calculate:
      an angle error value as a difference between an articulation angle setpoint and the articulation angle as measured by the angle sensor;
      the desired yaw rate using the angle error value;
      a product of (i) a sine of the angle error value and (ii) a numeric gain value selected from a lookup table based on the length of the tether device; and
      the desired yaw rate using the product.

2. The e-pallet of claim 1, wherein the length sensor is integral with the tether device.

3. The e-pallet of claim 2, wherein the length sensor includes a string potentiometer.

4. The e-pallet of claim 1, wherein the driven drive wheels include a pair of front drive wheels, and the electric motor includes first and second electric motors respectively connected to a different one of the front drive wheels to provide the e-pallet with a differential steering capability.

5. The e-pallet of claim 4, wherein the sensor suite includes first and second speed sensors coupled to a respective one of the first and second electric motors, and configured to measure respective wheel speeds thereof, and wherein the electronic controller is configured to calculate the ground speed of the e-pallet using the wheel speeds.

6. The e-pallet of claim 1, wherein the longitudinal dynamics control loop is configured to calculate a length error value as a difference between a desired distance setpoint and the length as measured by the length sensor, and to calculate the desired ground speed using the length error value.

7. The e-pallet of claim 6, wherein the longitudinal dynamics control loop is configured to apply a gain to the actual ground speed to thereby calculate a modified ground speed, to determine a speed error value from the length error value, and to calculate the desired ground speed in part by adding the speed error value to the modified ground speed.

8. The e-pallet of claim 7, wherein the longitudinal dynamics control loop is configured to determine the speed error value by referencing a lookup table indexed by the length error value and extracting the speed error therefrom.

9. The e-pallet of claim 1, wherein the sensor suite includes a yaw rate sensor configured to measure an actual yaw rate, and the longitudinal dynamics control loop is configured to limit the ground speed of the e-pallet, as an initial speed limit, based on the actual yaw rate and a current torque capacity of the electric motor.

10. A method for controlling an electronic pallet (e-pallet) having a superstructure mounted on or formed integrally with a base platform, a tether device connected to the superstructure, wherein the tether device defines an articulation angle with respect to a leading edge of the superstructure and is configured to be grasped at one end by a human operator when towing the e-pallet, the method comprising:
   determining a set of input signals, including measuring an actual ground speed of the e-pallet, an articulation angle between the tether device and a leading edge of the superstructure, and a length of the tether device;
   in response to the input signals, generating a set of motor control signals using proportional-integral-derivative (PID) control logic of an electronic controller, the PID control logic having a lateral dynamics control loop coupled with a longitudinal dynamics control loop respectively determining a desired yaw rate and a desired ground speed of the e-pallet; and
   in response to the desired yaw rate and the desired ground speed, transmitting a set of motor control signals to an electric motor connected to two or more driven road wheels of the e-pallet to thereby cause the electric motor to provide a drive torque thereto, thereby accommodating for motion of the human operator imparted to the tether device;

calculating, via the longitudinal dynamics control loop, a length error value as a difference between a desired distance setpoint and the length as measured by the length sensor;

calculating the desired ground speed using the length error value;

applying a gain value to the actual ground speed, via the longitudinal dynamics control loop, to thereby calculate a modified ground speed value;

determining a speed error value from the length error value; and calculating the desired ground speed in part by adding the speed error value to the modified ground speed value.

11. The method of claim 10, wherein determining the input signals includes measuring the length of the tether device using a string potentiometer that is integral with the tether device, wherein the length sensor includes the string potentiometer.

12. The method of claim 10, wherein transmitting the set of motor control signals to the electric motor includes transmitting the set of motor control signals to first and second electric motors respectively connected to a different one of the driven road wheels to differentially steer the e-pallet using different torques and/or speeds of the first and second electric motors.

13. The method of claim 12, including first and second speed sensors are coupled to a respective one of the first and second electric motors, wherein measuring the set of input signals includes measuring respective wheel speeds of the first and second motors, the method further comprising calculating the actual ground speed of the e-pallet using the respective wheel speeds.

14. The method of claim 10, further comprising using the lateral dynamics control loop to calculate an angle error value as a difference between an articulation angle setpoint and the articulation angle as measured by the angle sensor, and calculating the desired yaw rate via the electronic controller using the angle error value.

15. The method of claim 14, further comprising calculating a sine of the angle error value via the lateral dynamics control loop, calculating a product of the sine of the angle error value and a numeric gain value selected from a lookup table based on the length of the tether device, and calculating the desired yaw rate using the product of the sine of the angle error value and the numeric gain value.

16. The method of claim 10, further comprising measuring an actual yaw rate of the e-pallet using a yaw rate sensor; and limiting the ground speed of the e-pallet via the longitudinal dynamics control loop, as an initial speed limit, based on the actual yaw rate and a current torque capacity of the at least one electric motor.

17. The method of claim 10, wherein determining the speed error value includes referencing a lookup table indexed by the length error value and extracting the speed error therefrom.

18. An electronic controller for an electronic pallet (e-pallet) having a superstructure connected to a base platform, one or more driven road wheels connected to the base platform, and at least one electric motor connected to the one or more driven road wheels, comprising:

a processor; and tangible non-transient memory on which instructions are recorded for controlling motion of the e-pallet when the e-pallet is towed by a human operator via a tether device, wherein execution of the instructions by the processor causes the processor to:

receive input signals inclusive of an actual ground speed of the e-pallet, an articulation angle between the tether device and a leading edge of the e-pallet, and a length of the tether device as measured by a speed sensor, an angle sensor, and a length sensor, respectively;

generate a set of motor control signals in response to the input signals using proportional-integral-derivative (PID) control logic of the electronic controller, the PID control logic having a lateral dynamics control loop coupled with a longitudinal dynamics control loop respectively determining a desired yaw rate and a desired ground speed of the e-pallet; and transmit the set of motor control signals to the at least one electric motor to cause the one or more electric motors to power the one or more driven road wheels of the e-pallet, thereby accommodating for motion of the human operator imparted to the tether device, wherein the PID control logic is configured to:

calculate, via the longitudinal dynamics control loop, a length error value as a difference between a desired distance setpoint and the length as measured by the length sensor;

calculate the desired ground speed using the length error value;

apply a gain value to the actual ground speed, via the longitudinal dynamics control loop, to thereby calculate a modified ground speed value;

determine a speed error value from the length error value; and calculate the desired ground speed in part by adding the speed error value to the modified ground speed value.

19. The electronic controller of claim 18, wherein the longitudinal dynamics control loop is configured to calculate a length error value as a difference between a desired distance setpoint and the length as measured by the length sensor, and to calculate the desired ground speed using the length error value.

20. The electronic controller of claim 18, wherein the PID control logic is configured to determine the speed error value by referencing a lookup table indexed by the length error value and extracting the speed error therefrom.

* * * * *